United States Patent
Mokashi et al.

(10) Patent No.: US 9,288,446 B2
(45) Date of Patent: Mar. 15, 2016

(54) VEHICLE VIDEO SYSTEM

(75) Inventors: Sumedh Mokashi, Farmington Hills, MI (US); Richard Miller, Brentwood, TN (US)

(73) Assignee: Nissan North America, Inc., Franklin, TN (US)

( * ) Notice: Subject to any disclaimer, the term of this patent is extended or adjusted under 35 U.S.C. 154(b) by 364 days.

(21) Appl. No.: 13/608,646

(22) Filed: Sep. 10, 2012

(65) Prior Publication Data

US 2014/0071279 A1 Mar. 13, 2014

(51) Int. Cl.
*H04N 7/00* (2011.01)
*H04N 7/18* (2006.01)

(52) U.S. Cl.
CPC ........................ *H04N 7/18* (2013.01)

(58) Field of Classification Search
CPC ....................................................... H04N 7/18
USPC ....................................................... 348/148
See application file for complete search history.

(56) References Cited

U.S. PATENT DOCUMENTS

| | | | |
|---|---|---|---|
| 5,452,982 A | 9/1995 | Engle | |
| 6,970,184 B2 | 11/2005 | Hirama et al. | |
| 7,151,443 B2 | 12/2006 | Dialinakis | |
| 7,295,229 B2 * | 11/2007 | Kumata | B60R 1/00 348/148 |
| 7,336,805 B2 | 2/2008 | Gehring et al. | |
| 7,355,629 B2 | 4/2008 | Lang et al. | |
| 7,429,051 B2 | 9/2008 | Bauer et al. | |
| 7,432,799 B2 | 10/2008 | Tsuboi | |
| 7,568,716 B2 | 8/2009 | Dietz | |
| 7,684,593 B2 | 3/2010 | Chinomi | |
| 8,243,994 B2 | 8/2012 | Suzuki et al. | |
| 8,330,817 B1 * | 12/2012 | Foster | 348/148 |
| 2006/0119472 A1 * | 6/2006 | Tsuboi | 340/435 |
| 2009/0257659 A1 | 10/2009 | Suzuki et al. | |
| 2010/0194596 A1 * | 8/2010 | Wang et al. | 340/936 |
| 2010/0238051 A1 | 9/2010 | Suzuki et al. | |
| 2011/0210868 A1 | 9/2011 | Yano et al. | |
| 2012/0069182 A1 | 3/2012 | Sumi et al. | |
| 2012/0229639 A1 * | 9/2012 | Singleton | 348/148 |
| 2013/0076007 A1 * | 3/2013 | Goode et al. | 280/504 |
| 2014/0036072 A1 * | 2/2014 | Lyall et al. | 348/143 |
| 2014/0309888 A1 * | 10/2014 | Smit et al. | 701/41 |

FOREIGN PATENT DOCUMENTS

| | | |
|---|---|---|
| JP | 2002-262281 A | 9/2002 |
| JP | 2010-093567 A | 4/2010 |
| JP | 2010-136082 A | 6/2010 |
| JP | 2010-166196 A | 7/2010 |

* cited by examiner

*Primary Examiner* — Sath V Perungavoor
*Assistant Examiner* — Jeffery Williams
(74) *Attorney, Agent, or Firm* — Global IP Counselors, LLP

(57) ABSTRACT

A vehicle includes a vehicle body defining a cargo area, a display mounted to the vehicle, a first video camera and an image processor. The first video camera is fixedly mounted to the vehicle at a first fixed location in a prescribed orientation relative to the vehicle to capture a video image of the cargo area. The image processor is operatively coupled to the first video camera and the display to process the video image captured by the first video camera and to stream a simulated video overhead view including at least a portion of the cargo area on the display.

16 Claims, 13 Drawing Sheets

VEHICLE VIDEO SYSTEM

BACKGROUND

1. Field of the Invention

The present invention generally relates to a vehicle video system. More specifically, the present invention relates to vehicle video system that includes a camera aimed to capture video images of a cargo area of the vehicle and a system for converting video images captured by the camera into a simulated overhead view of the cargo area.

2. Background Information

Many vehicles have been provided with video cameras, primarily video cameras that provide captured images of areas rearward of the vehicle. One such vehicle includes a display mounted to or installed within an instrument panel of the vehicle, the display showing streaming video images of the areas rearward of the vehicle captured by the video camera. The streaming video images of the areas rearward of the vehicle are displayed in order to assist the driver of the vehicle during the process of parking the vehicle, or for other maneuvers, where the vehicle is moving in reverse (moving backward).

Similarly, a plurality of video cameras have been mounted to a front end and sides of the vehicle such that the driver can observe the streaming video on the display of the images captured by one or all of the plurality of cameras. The plurality of cameras are for the purpose of providing streaming video that the driver can observe while parking the vehicle, to avoid contact with other parked vehicles or stationary objects. Thus, the driver of the vehicle is able to observe movement and/or the location of objects within the areas outside and adjacent to the vehicle as captured by the plurality of cameras.

SUMMARY

One object is to provide a vehicle having a cargo area with a camera that captures video images of the cargo area, with the captured video images being used to generate a simulated overhead view of the cargo area such that the vehicle operator can view a streaming video of the cargo area on a display within the vehicle.

In view of the state of the known technology, in one aspect of the present disclosure, a vehicle includes a vehicle body defining a cargo area, a display mounted to the vehicle, a first video camera and an image processor. The first video camera is fixedly mounted to the vehicle at a first fixed location in a prescribed orientation relative to the vehicle to capture a video image of the cargo area. The image processor is operatively coupled to the first video camera and the display to process the video image captured by the first video camera and to stream a simulated video overhead view including at least a portion of the cargo area on the display.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
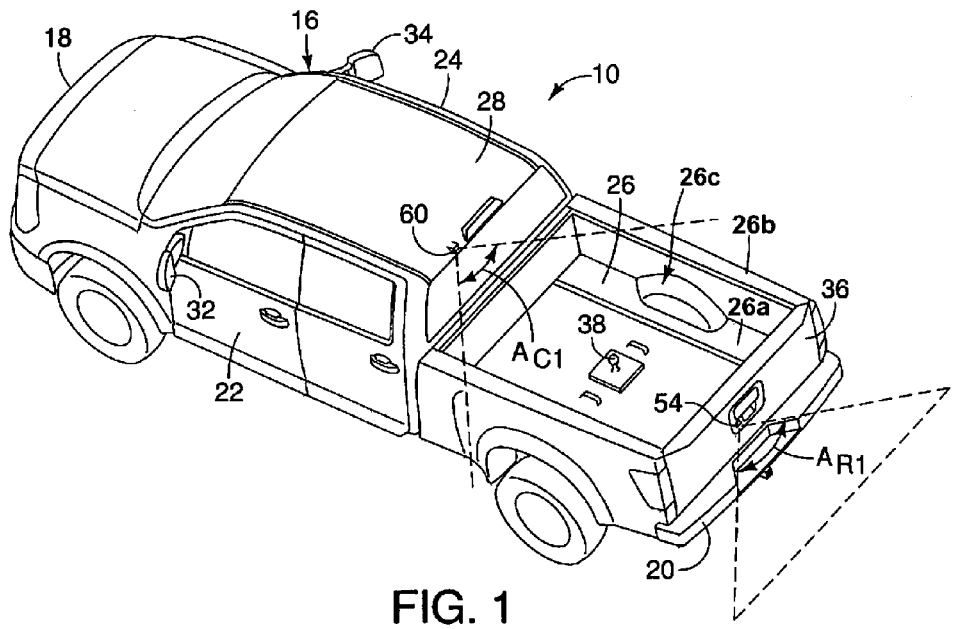
FIG. 1 is a perspective view of a vehicle that includes a cargo area, the vehicle having a vehicle video system with a camera positioned to capture video of the cargo area in accordance with a first embodiment.

Referring initially to FIG. 1, a vehicle 10 is illustrated in accordance with a first embodiment. The vehicle 10 includes a video system 12 depicted schematically in FIG. 2, and is described in greater detail below.

The vehicle 10 includes a vehicle body 16 with a front end 18, a rear end 20, a driver's side 22, a passenger's side 24, a cargo area 26 and a cabin structure 28 with a passenger compartment 30 therein. It should be understood that the driver's side 22 and the passenger's side 24 are merely labeled as such with reference to a left-hand drive vehicle and that the functionality of the video system 12 according to the present invention can be identical in a right-hand drive vehicle. The driver's side 22 includes a driver's side mirror assembly 32, and the passenger's side 24 includes a passenger's side mirror assembly 34. The cargo area 26 can include a variety of features, for example, a tailgate 36 and a trailer hitch receiver 38. As shown in FIG. 1, the cargo area 26 is a conventional pickup truck structure that includes a floor 26a and side walls 26b that define an interior space 26c that is configured to receive cargo (not shown). An upper area of an interior space 26c of the cargo area 26 is exposed in a conventional manner. The interior space 25c of the cargo area 26 is defined between side walls 26a and the floor 26b of the cargo area 26. The tailgate 36 (a movable member) is movable between a closed position (FIG. 1) confining a rear portion of the interior space 26c of the cargo area 26 and an open position (indicated in FIGS. 14-16) providing easy access to the rear portion of the interior space 26c of the cargo area 26. The tailgate 36 can also be completely removed from the vehicle 10.

Figure 2:
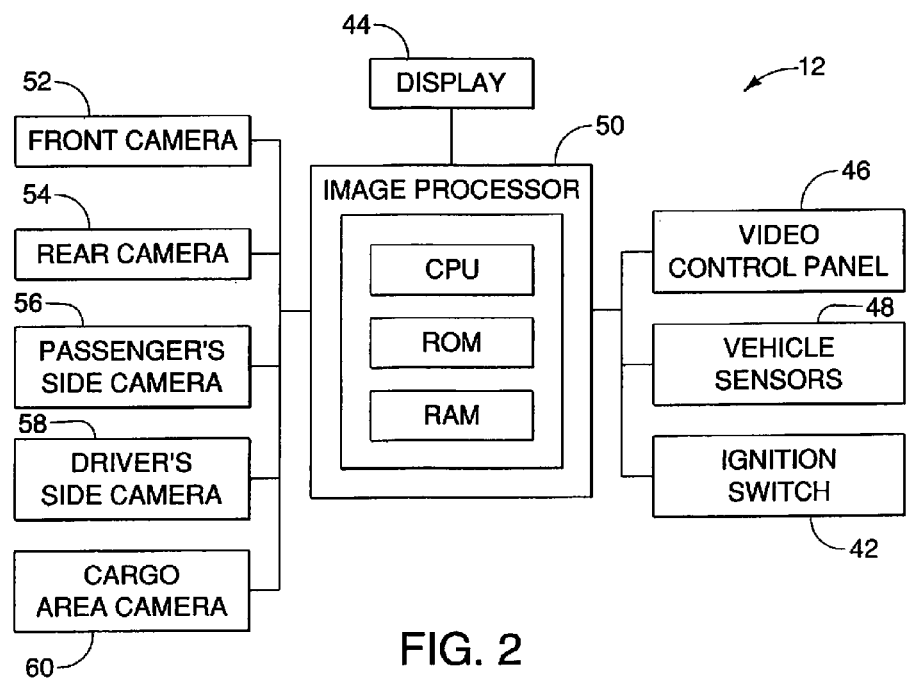
FIG. 2 is a schematic view of the vehicle video system showing a plurality of cameras, including a front camera, a rear camera, a passenger's side camera and a driver's side camera, the cargo area camera, an image processor and a video display in accordance with the first embodiment.
Figure 3:
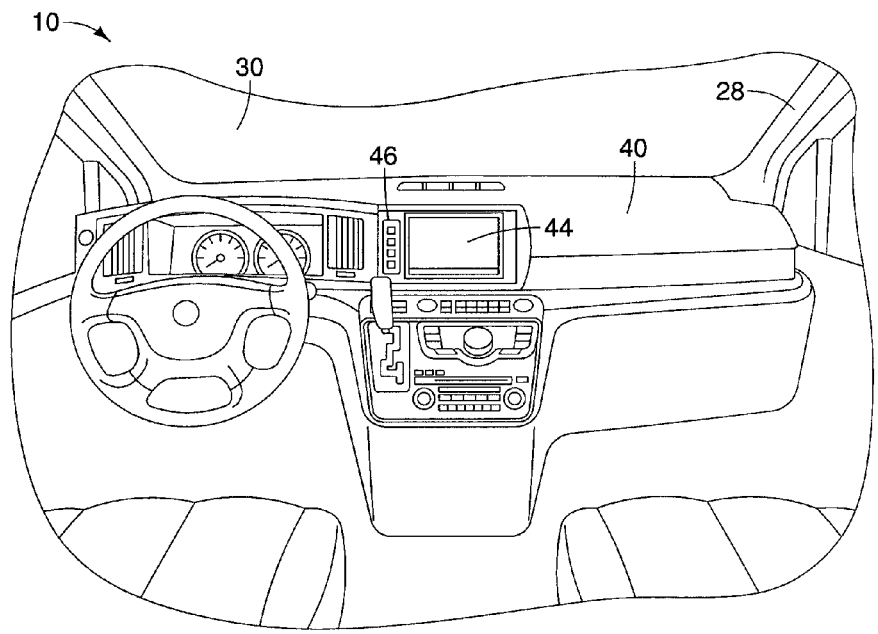
FIG. 3 is a view of a passenger compartment of the vehicle showing the video display of the vehicle video system in an instrument panel in accordance with the first embodiment.

The passenger compartment 30 includes an instrument panel 40, as shown in FIG. 3. The instrument panel 40 includes a variety of features, such as lighting switches, air conditioning controls, radio, an ignition switch 42 (only shown in FIG. 2), a display 44 and a video control panel 46.

As shown in FIG. 2, the video system 12 includes the display 44, the video control panel 46, vehicle sensors 48, an image processor 50, a front camera 52, a rear camera 54, a passenger's side camera 56, a driver's side camera 58 and a cargo area camera 60.

In the depicted embodiment of the video system 12, there are five cameras, the front camera 52, the rear camera 54, the passenger's side camera 56, the driver's side camera 58 and the cargo area camera 60. However, it should be understood from the drawings and the description herein that the number of cameras installed to the vehicle 10 can be varied. For example, in one embodiment, the vehicle 10 can be provided with just one camera (e.g., the cargo area camera 60), multiple cargo area cameras, and/or the plurality of video cameras depicted schematically in FIG. 2 capturing video images of the area around the periphery of the vehicle 10, as described below.

In the description of the video system 12, several terms are used in a manner consistent with the definitions provided below.

Specifically, the terms "video", "video image" or "video images" as used herein refer to a series of captured images showing current movement or lack of movement in a predetermined area captured by each respective one of the plurality of cameras including the cargo area camera 60.

The term "simulated live overhead view" as used herein refers to a video image of an area that is captured by one or more cameras that are not physically oriented capture a literal top plan view of the area. Rather, the captured video images are processed to generate or form an appearance of a top plan view of the corresponding area.

The terms "stream", "streaming", "streaming video", or other similar forms as used herein include storing the video image in a storage device (e.g. RAM, hard drive, FLASH memory, etc.,) prior to displaying. However, preferably, the streaming has only a prescribed amount of latency (125 milliseconds delay or less—125 milliseconds is $\frac{1}{8}^{th}$ of a second) between the moment of capture and the moment the video image or video images are displayed on the display 44.

As is described in greater detail below, the display 44 is configured to display a variety of video images in the form of streaming video. Specifically, the display 44 receives processed video data from the image processor 50 based upon video images captured by one, selected ones or all of the plurality of cameras of the video system 12 depicted in FIG. 2. The display 44 can be configured in any of a variety of ways. For example, the display 44 can display: streaming video from just one selected camera at a time; streaming video from all of the cameras; or a simulated overhead view where some or all of the captured video images are manipulated by the image processor 50 and then superimposed over a still image of the vehicle 10, to produce the simulated overhead view of the vehicle 10 and surrounding areas on all sides of the vehicle 10, as is described in greater detail below. In the depicted embodiments, the display 44 is also configured to provide a split screen where half of the viewing area of the display 44 shows the actual streaming video images from the selected camera and the other half of the display 44 shows a selected overhead simulated view of the vehicle 10 and the areas around the vehicle 10.

The video control panel 46 in the instrument panel 40 is provided with one or more controls that allow an occupant of the vehicle 10 to select the type of view desired for output on the display 44. For example, the video control panel 46 can be provided with quick glance buttons or inputs (not shown) that cause the image processor 50 to stream captured images from a specific one of the plurality of cameras for just a short, predetermined period of time. One example of such a quick glance button includes a request to stream the captured video from the passenger's side camera 38 for ten (10) to fifteen (15) seconds to the display 44 so that the driver monitor the status of objects within the field of view of the passenger's side camera 38. Another example of a quick glance button includes a request to stream the captured video from the cargo area camera 60 for ten (10) seconds to fifteen (15) seconds so that the driver monitor the status of objects in the cargo area 26. Other features of the video system 12 are explained in greater detail below.

The vehicle sensors 48 vary from vehicle to vehicle. The vehicle sensors 48 can be a single sensor or an array of sensors. However in the depicted embodiment, the vehicle sensors 48 can include a vehicle speed sensor (not shown), a transmission sensor (not shown) and a tailgate position sensor within the tailgate 36 or at the rear end 20 of the vehicle 10. The speed sensor provides vehicle speed information to the image processor 50 such that, below a prescribed speed, the image processor automatically sets the display 44 to, for example, display a video image captured by a predetermined one of the cameras, or alternatively, can shut off the display 44 during high speed operation of the vehicle 10 (e.g., above speeds typically associated with parking procedures). The transmission sensor can be configured to provide the image processor 50 with the status of the transmission of the vehicle 10. For example, when the transmission is set in reverse such that the vehicle 10 is capable of moving rearward, the video image captured by the rear camera 54 can be automatically displayed on the display 44. The tailgate position sensor provides an indication of the position of the tailgate 36. As is described in greater detail below, when the tailgate 36 is in an open position, the performance of the rear camera 54 may be compromised. The tailgate position sensor of the plurality of sensors 48 provides the image processor 50 with an indication of the status of the rear camera 54.

The image processor 50 is configured to process the various video images captured by the plurality of cameras 52, 54, 56, 58 and 60 in a manner described in greater detail below. The image processor 50 preferably includes a microcomputer (i.e., a central processing unit or CPU) with a video processing control program that processes streaming video output to the display 44. The image processor 50 can also include other conventional components such as an input interface circuit, an output interface circuit, and storage devices such as a ROM (Read Only Memory) device and a RAM (Random Access Memory) device. The microcomputer of the image processor 50 is programmed to process the video images from the plurality of cameras in order to generate simulated overhead views of the areas captured by each of the plurality of cameras, as is described in greater detail below. The memory circuit stores processing results and control programs such as ones for video processing operations that are run by the image processor 50. The image processor 50 is operatively coupled to the plurality of cameras and the display 44 in a conventional manner, such as by coaxial cables, computer cables, wireless connections or other similar configurations capable of transferring video images or video data from one location to another within a vehicle. The internal RAM of the image processor 50 stores statuses of operational flags and various control data. The internal ROM of the image processor 50 stores image data and transformational data for various operations. The image processor 50 is capable of selectively controlling any of the components of the video system 12 in accordance with the control program. It will be apparent to those skilled in the art from this disclosure that the precise structure and algorithms for the image processor 50 can be any combination of hardware and software that will carry out the functions of the present invention.

It should also be understood from the drawings and the description herein that the image processor 50 can be programmed to stream any of a variety of combinations of video images to the display 44. The depictions of the display 44 and its streamed content shown in FIGS. 11-14 are some examples of the types of streamed video images that can be shown in the display 44. However, the present invention is not limited to the examples of streamed video images shown on the display 44 in FIGS. 11-14. The display 44 can show a full screen video image or multiple split screen configurations depending upon the pre-programming and configuration of the image processor 50.

Figure 4:
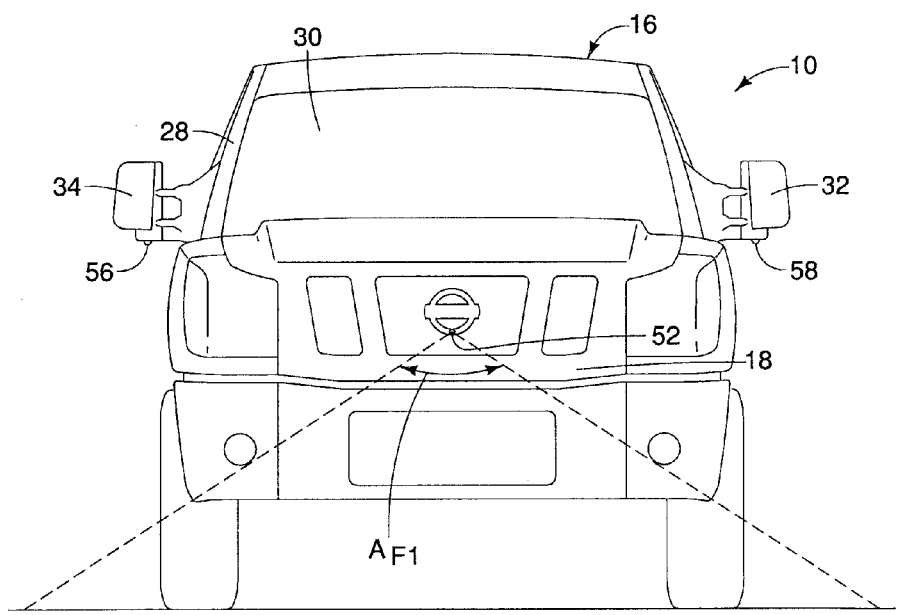
FIG. 4 is a front view of the vehicle showing the position of the front camera of the vehicle video system in accordance with the first embodiment.

A description of the plurality of cameras is now provided with respect to FIGS. 1 and 4-8. As shown in FIG. 4, the front camera 52 is fixedly attached to the vehicle body 16 at the front end 18 of the vehicle 10. In the depicted embodiment, the front camera 52 is fixedly attached to an emblem of the front grille at the front end 18 of the vehicle 10. The front camera 52 is fixed in position relative to the front end 18 such that the front camera 52 captures video of the area frontward of the front end 18 of the vehicle 10. The front camera 52 is aimed downwardly, but is angled relative to vertical so that the front camera 52 is aimed at the area frontward of the front end 18 of the vehicle 10. The angle $A_{F1}$ in FIG. 4 provides an approximate frontal indication of the field of view captured by the front camera 52. The angle $A_{F2}$ in FIG. 9 shows an approximate side indication of the field of view captured by the front camera 52.

Figure 5:
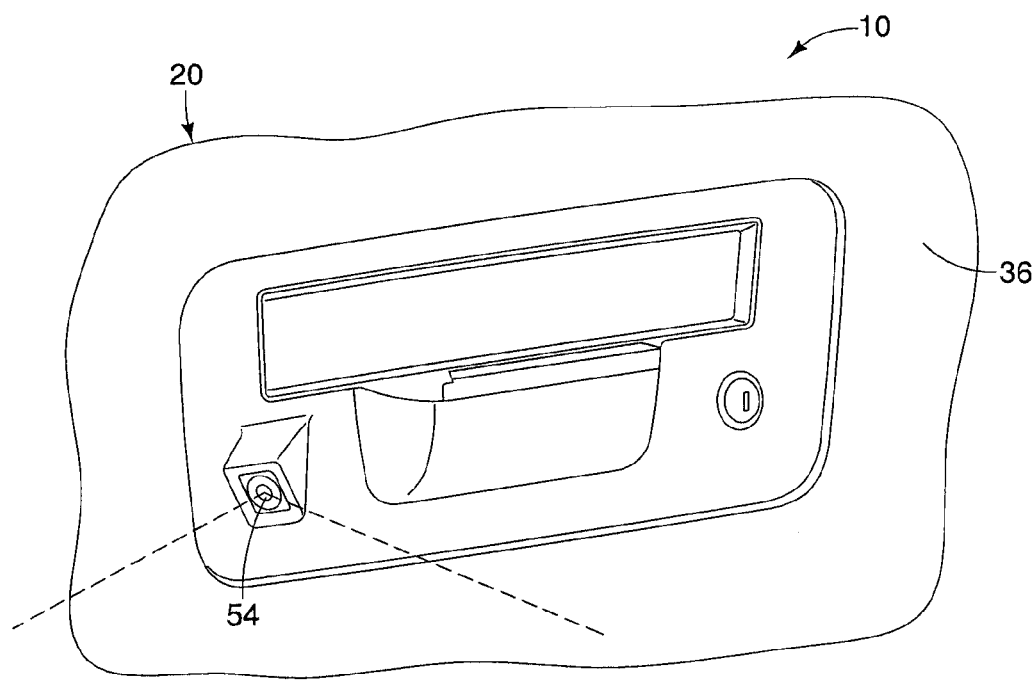
FIG. 5 is a perspective view of a rear portion of the vehicle showing the position of the rear camera on a tailgate of the vehicle in accordance with the first embodiment.

As shown in FIGS. 1 and 5, the rear camera 54 is fixedly attached the tailgate 36 at the rear end 20 of the vehicle 10. In the depicted embodiment, the rear camera 54 is fixed to a plate or housing of the latch release handle of the tailgate 36. The rear camera 54 is fixed in position relative to the tailgate 36 such that the rear camera 54 captures the area rearward of the rear end 20 of the vehicle 10. With the tailgate 36 in the closed position, the rear camera 54 is aimed downwardly, but is angled relative to vertical so that the rear camera 54 is aimed at the area rearward of the rear end 20 of the vehicle 10. The angle $A_{R1}$ in FIG. 1 provides an approximate indication of the side-to-side field of view captured by the rear camera 54. The angle $A_{R2}$ in FIG. 9 shows an approximate side indication of the rearward field of view captured by the rear camera 54.

Figure 6:
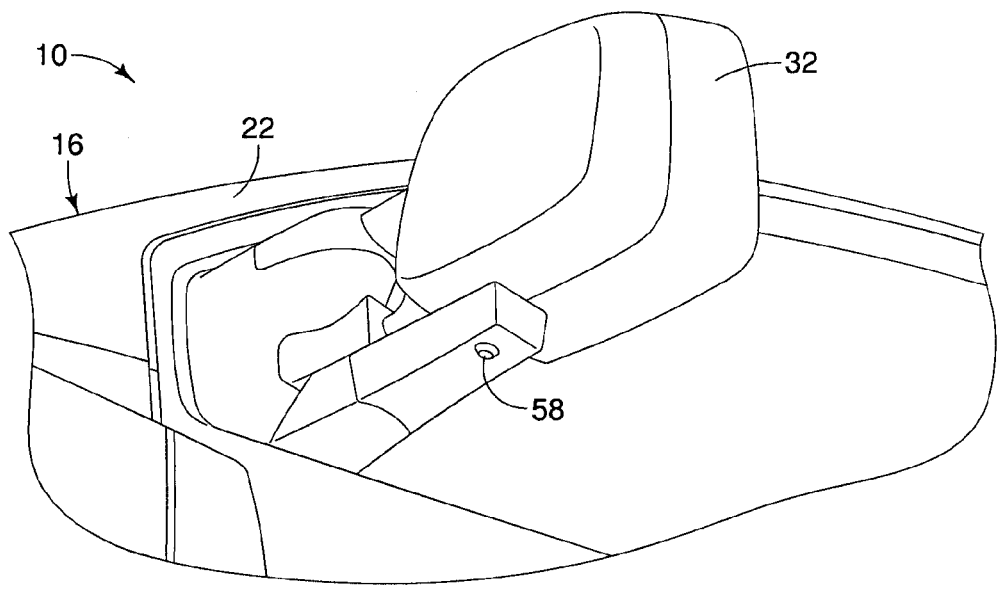
FIG. 6 is another perspective view of the vehicle showing the position of the driver's side camera (and indicating the position of the passenger's side camera) on a side view mirror assembly of the vehicle in accordance with the first embodiment.

As shown in FIG. 6, the driver's side camera 58 is fixedly attached an underside of the driver's side mirror assembly 32 at the driver's side 22 of the vehicle 10. The passenger's side camera 56 is similarly attached to an underside of the passenger's side mirror assembly 34. The driver's side camera 58 is fixed in position relative to the driver's side mirror assembly 32 with the driver's door closed such that the driver's side camera 58 captures the area along the side of the driver's side 22 of the vehicle 10. The angle $A_{DS}$ in FIG. 9 provides an approximate indication of the field of view captured by the driver's side camera 58.

Since the passenger's side camera 56 is symmetrically installed to the passenger's side mirror assembly 34 in a manner consistent with the driver's side camera 58, further description of the passenger's side camera 56 is omitted for the sake of brevity.

Figure 7:
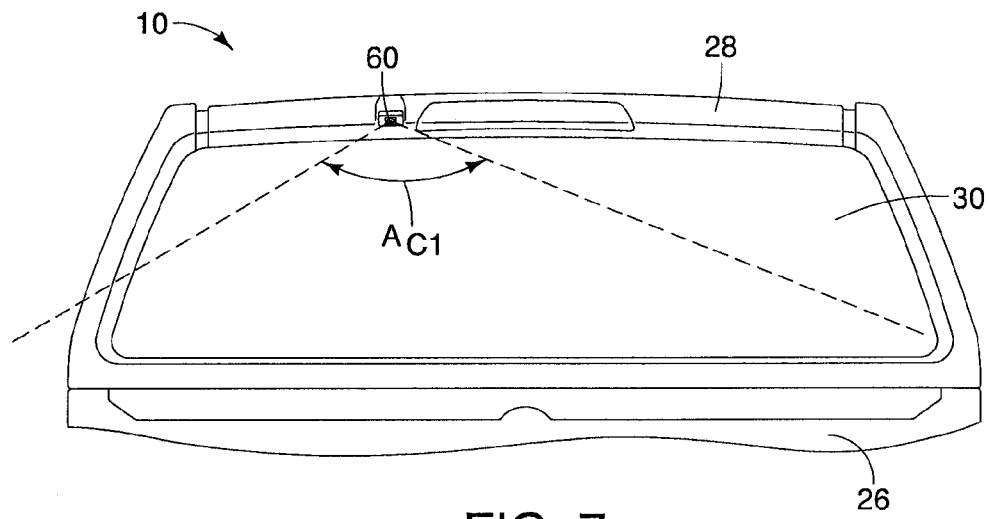
FIG. 7 is a rear view of a rear portion of a cabin structure of the vehicle showing the position of the cargo area camera in accordance with the first embodiment.
Figure 8:
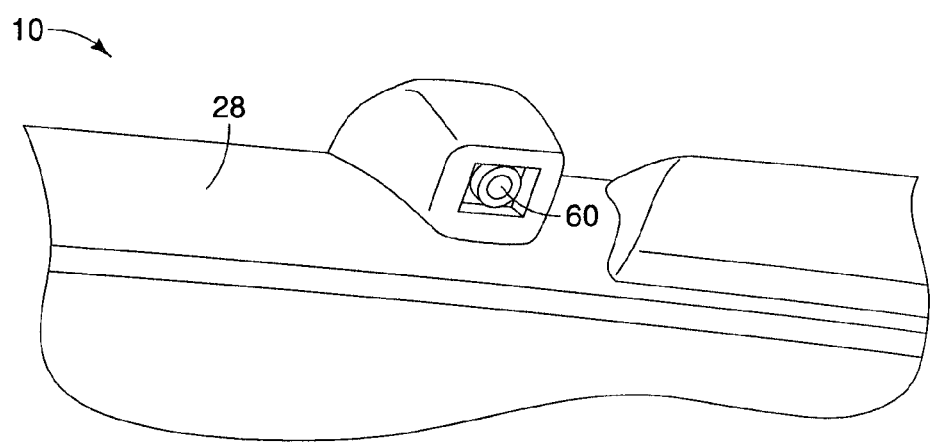
FIG. 8 is another perspective view depicting the rear portion of the cabin structure of the vehicle further showing the position of the rear camera in accordance with the first embodiment.
Figure 9:
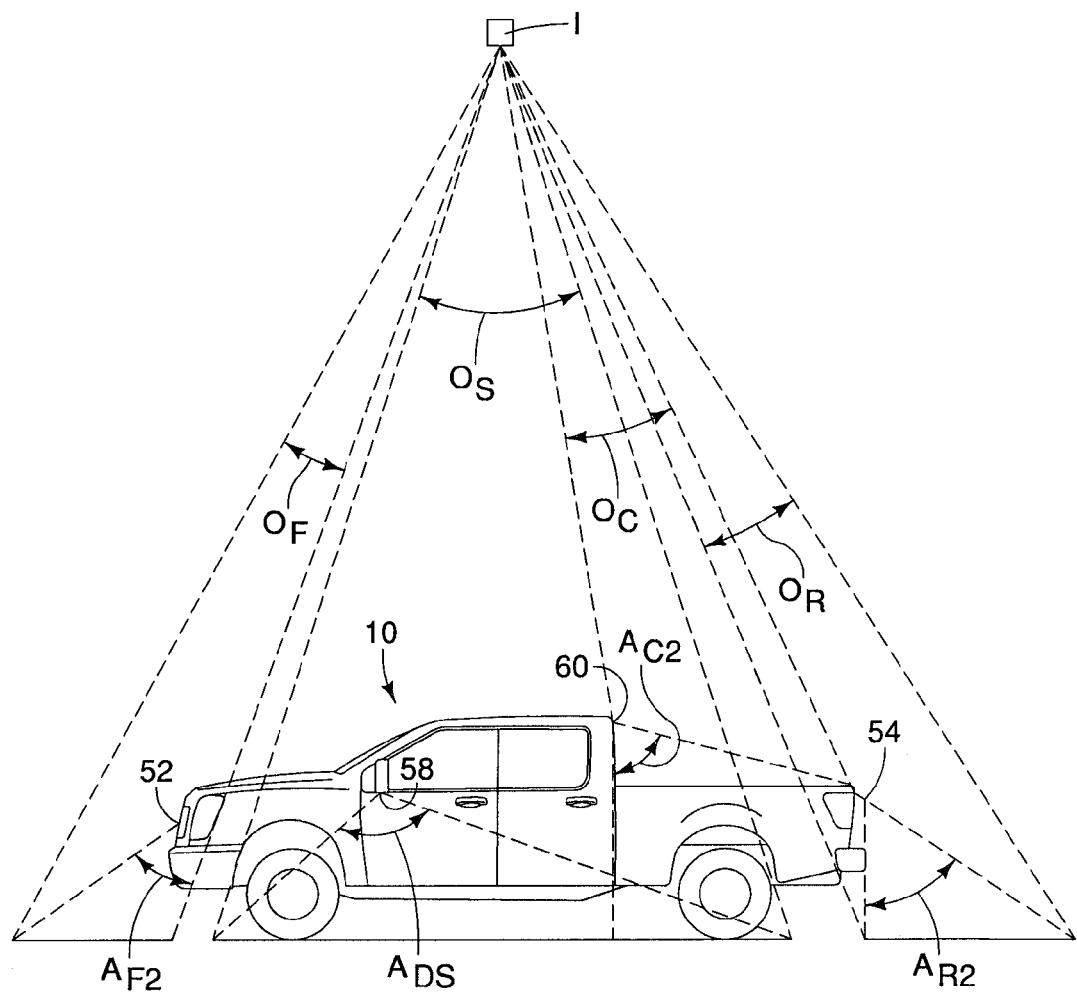
FIG. 9 is a schematic view of the vehicle showing a virtual or imaginary point above the vehicle pre-programmed into the image processor for generating simulated overhead views of the cargo area and areas around the vehicle (as indicated in FIG. 13), the image processor using video captured by the cargo area camera, the front camera, the rear camera, the passenger's side camera and the driver's side camera, in accordance with the first embodiment.

As shown in FIGS. 1, 7 and 8, the cargo area camera 60 is fixedly attached the rearward end of the roof of the cabin structure 30 of the vehicle 10. The cargo area camera 60 is fixed in position relative to the cabin structure 28 such that the cargo area camera 60 captures the cargo area 26 and areas rearward of the rear end 20 of the vehicle 10 when the tailgate 36 is in the down or open position. The cargo area camera 60 is aimed downwardly, but is angled relative to vertical so that the cargo area camera 60 is aimed primarily at the cargo area 26, but as is described further below, the cargo area camera 60 can also capture the area rearward of the rear end 20 of the vehicle 10 with the tailgate 36 in the open position. The angle $A_{C1}$ in FIGS. 1 and 7 provides an approximate indication of the side-to-side field of view captured by the cargo area camera 60. The angle $A_{C2}$ in FIG. 9 provides an approximate side indication of the rearward field of view captured by the cargo area camera 60.

Each of the plurality of cameras (the front camera 52, the rear camera 54, the passenger's side camera 56, the driver's side camera 58 and the cargo area camera 60) are installed at predetermined, fixed locations relative to the vehicle body 16. These predetermined, fixed locations are used by the image processor 50 such that a simulated overhead view is generated, as described below. As is explained in greater detail below, the generation of each of the simulated overhead views from the images captured by each of the plurality of cameras requires that the position of each camera relative to the vehicle body 16 be fixed. For the rear camera 54, the fixed position is predetermined with the tailgate 36 in the closed position. For the passenger's side camera 56 and the driver's side camera 58, the respective fixed positions are predetermined with the passenger and driver doors in their respective closed positions.

Hence, the cargo area camera 60 is fixedly mounted to the vehicle 10 at the rear portion of the roof of the cabin structure 28, which is a fixed location relative to the vehicle 10. Further, the cargo area camera 60 is fixed in a prescribed orientation relative to the vehicle 10 to capture video images of the cargo area 26, as indicated in 1, 7 and 9.

A description of the image processor 50 and its operation is now provided with reference to FIGS. 9 through 16. As mentioned above, the image processor 50 is configured to receive the video images captured by any one and/or all of the plurality of cameras and stream them to the display 44 such that the driver of the vehicle 10 can look at the display 44 and observe the streaming video. The image processor 50 is also configured to: receive the video images captured by any one and/or all of the plurality of cameras; process each of the images thereby producing simulated overhead views of the area captured by a selected one and/or all of the plurality of cameras; and stream the simulated overhead view or views to the display 44, overlaying the simulated views over a still image of the vehicle 10, such that the driver of the vehicle 10 can look at the display 44 and observe streaming video of the simulated overhead view or views.

FIG. 9 shows a side view of the vehicle 10 showing the front camera 52, the rear camera 54, the driver's side camera 58 and the cargo area camera 60. It should be understood that the passenger's side camera 56 is symmetrically placed on the passenger's side 24 of the vehicle 10, opposite from the driver's side 22 of the vehicle 10, and therefore captures an area along the side of the vehicle 10 opposite from the driver's side camera 58.

In FIG. 9, the angle $A_{F2}$ shows the indication of the field of view captured by the front camera 52, the angle $A_{R2}$ shows the indication of the field of view captured by the rear camera 54, the angle $A_{DS}$ shows the indication of the field of view captured by the driver's side camera 58 and the angle $A_{C2}$ shows the indication of the field of view captured by the cargo area camera 60. As indicated above, the passenger's side camera 56 captures a field of view similar to that of the driver's side camera 58. The image processor 50 receives the video images from each of the plurality of cameras and processes them to produce corresponding overhead simulated views, with a virtual or imaginary view point I, also shown in FIG. 9.

Figure 13:
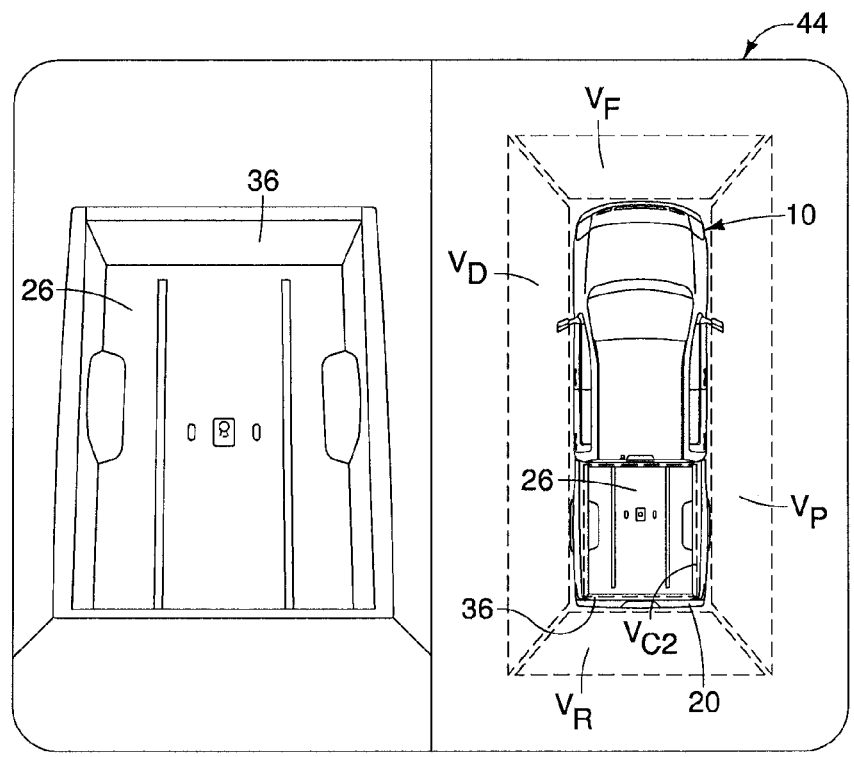
FIG. 13 is another schematic view of the video display with the split screen, one side streaming the video captured by the cargo area camera and the other side streaming the simulated overhead view of the cargo area and simulated overhead views of each of the areas around the vehicle captured by the front, rear, passenger's side and driver's side cameras, all superimposed over the still image of the vehicle in accordance with the first embodiment.
Figure 14:
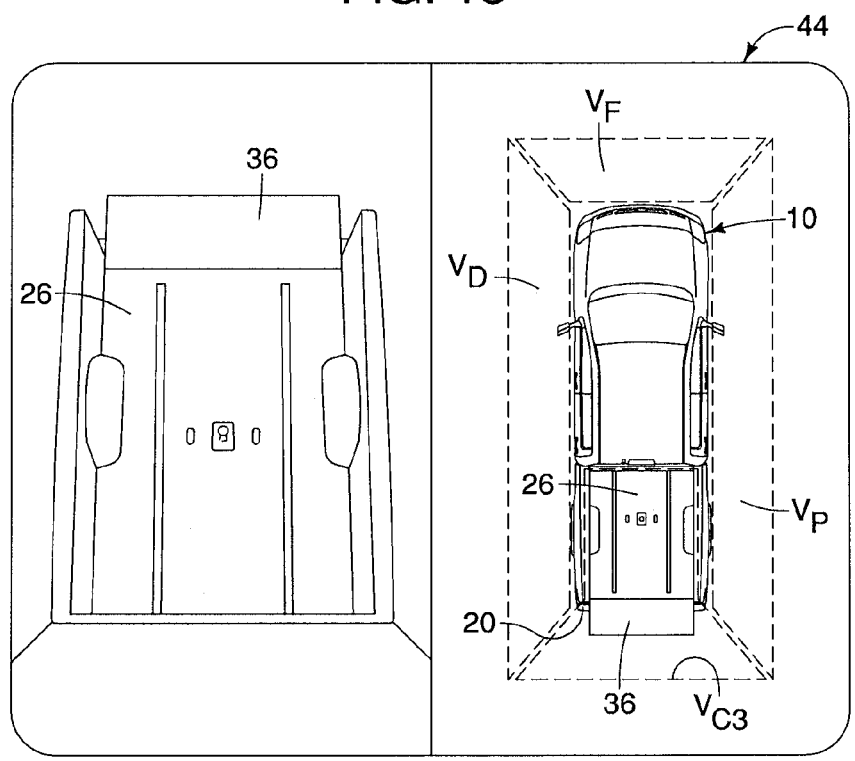
FIG. 14 is another schematic view of the video display with the split screen, one side streaming the video captured by the cargo area camera with the tailgate down and the other side streaming a simulated overhead view the cargo area and simulated overhead views of each of the areas around the vehicle captured by the front, passenger's side and driver's side cameras, all superimposed over the still image of the vehicle, with an area rearward from the vehicle being captured by the cargo area camera in accordance with the first embodiment.

In other words, the image processor 50 includes programming that takes the video images captured within the field of view corresponding to angle $A_{F2}$ by the front camera 52 and produces an overhead view $V_F$ as shown at the right side of the display 44 in FIGS. 13 and 14. The overhead view $V_F$ is generated by the image processor 50 to make it appear that the overhead view $V_F$ is actually captured from the imaginary view point I with a field of view corresponding to the overhead angle $O_F$ shown in FIG. 9.

Similarly, the image processor 50 takes the video images captured within the field of view corresponding to angle $A_{R2}$ by the rear camera 54 and produces an overhead view $V_R$ as shown at the right side of the display 44 in FIG. 13. The overhead view $V_R$ is generated by the image processor 50 to make it appear that the overhead view $V_R$ is actually captured from the imaginary view point I with a field of view corresponding to the overhead angle $O_R$ shown in FIG. 9.

Further, the image processor 50 takes the video images captured within the field of view corresponding to angle $A_{DS}$ by the driver's side camera 58 (and similarly from the passenger's side camera 56) and produces an overhead view $V_D$ (and overhead view $V_P$) as shown at the right side of the display 44 in FIGS. 13 and 14. The overhead view $V_D$ (and overhead view $V_P$) is generated by the image processor 50 to make it appear that the overhead view $V_D$ (and overhead view $V_P$) is actually captured from the imaginary view point I with a field of view corresponding to the overhead angle $O_S$ shown in FIG. 9.

The image processor 50 is further configured to process video images captured by the cargo area camera 60 in any of a variety of manners. Specifically, the image processor 50 can process the video images captured by the cargo area camera 60 to generate an unaltered streaming video of a view of the cargo area 26, as shown on the left side of the display 44 in each of FIGS. 11-14. The image processor 50 also processes the video images captured by the cargo area camera 60 to generate a first overhead image $V_{C1}$ of the cargo area 26 and limited areas rearward and to either rearward side of the vehicle 10 with the tailgate 36 in the closed position, as shown on the right side of the display 44 in FIG. 11. The image processor 50 can also process the video images captured by the cargo area camera 60 to generate a second overhead image $V_{C2}$ of the cargo area 26 as shown on the right side of the display 44 in FIGS. 12 and 13.

As well, the image processor 50 takes the video images captured within the field of view corresponding to angle $A_{C2}$ by the cargo area camera 60 and produces an overhead view $V_{C3}$ as shown on the right side of the display 44 in FIG. 14, which includes the cargo area 26 and areas rearward from the vehicle 10 with the tailgate 36 in the open position. The overhead views $V_{C1}$, $V_{C2}$ and $V_{C3}$ are generated by the image processor 50 to make it appear that the overhead view $V_R$ is actually captured from the imaginary view point I with a field of view corresponding to the overhead angle $O_R$ shown in FIG. 9. The driver of the vehicle 10 can select which of the overhead views $V_C$, $V_{C2}$ and $V_{C3}$ are to be streamed to the display by manually operating the video control panel 46.

The image processor 50 generates the various overhead views using any of a variety of algorithms. For example, in one embodiment, the image processor 50 is pre-programmed to include three dimensional coordinates relative to the vehicle body 16, of the predetermined locations of each of the front camera 52, the rear camera 54, the passenger's side camera 56, the driver's side camera 58 and the cargo area camera 60. The planar coordinates of the field of view of each of the plurality of cameras using an assumed level or generally flat ground under the vehicle 10 as a reference relative to the vehicle 10 are also pre-programmed or stored in the image processor 50. These three dimensional relationships are used to construct a conversion table (not shown) that is used by the image processor 50 to manipulate the captured images to generate the simulated overhead view $V_P$, $V_D$, $V_P$, $V_R$ and $V_{C3}$.

Since the predetermined locations of the plurality of cameras are fixed relative to the overall structure of the vehicle body 16, the processing work done by the image processor 50 is conducted using fixed coordinates or fixed reference points relative to the vehicle body 16. Specifically, the ground under the vehicle 10 is assumed to be flat providing a planar frame of reference and the plurality of cameras are at fixed locations relative to the vehicle body 16 and the ground under the vehicle 10. The image processor 50 is therefore provided with the three dimensional relative distances and three dimensional relative coordinates between the ground under the vehicle 10 and each of the plurality of cameras relative to the vehicle 10.

The image processor 50 carries out a coordinate conversion of each of the sets of video images captured by the front camera 52, the rear camera 54, the passenger's side camera 56, the driver's side camera 58 and the cargo area camera 60 using the known predetermined locations of the plurality of cameras, the areas relative to the vehicle 10 that each camera views and the imaginary view point I, and synthesizes or generates the simulated overhead views $V_F$, $V_D$, $V_P$, $V_R$ and $V_{C3}$ and superimposes them on the still image of the vehicle 10, as shown on the right side of the display 44 in FIG. 13.

The vehicle surroundings or areas around the vehicle 10 captured by the plurality of cameras, and the cargo within the cargo area 26 are included in the video images processed by the image processor 50. The image processor 50 can also process the video images of objects in the cargo area 26 and in the areas surrounding the vehicle 10 by using a relation between pixel addresses of the images before and after the conversion. Specifically, the image processor 50 carries out a viewpoint conversion (of the respective images of vehicle surroundings taken by the plurality of cameras) to the simulated overhead views. Then, after the viewpoint conversion, the image processor 50 joins the video images of the vehicle surroundings. With this, the image processor 50 converts the video images of the vehicle surroundings to the overhead view images (looking down the image-taking area from directly overhead at the center of the vehicle).

More detailed descriptions of various processes used to generate overhead simulated views can be found in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

Figure 10:
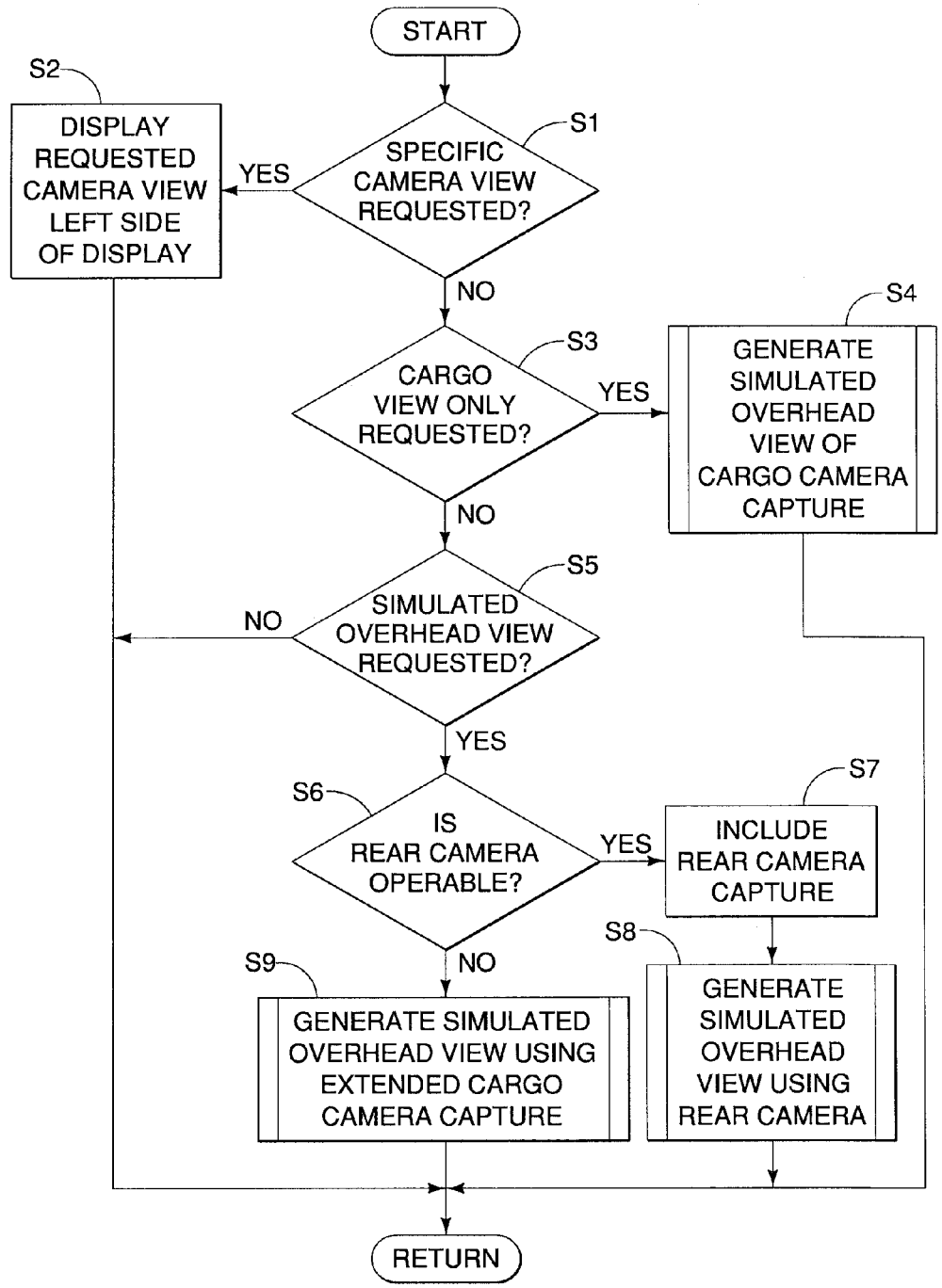
FIG. 10 is a flowchart showing operational steps performed by the image processor in accordance with the first embodiment.

A description of the basic operations of the image processor 50 is now provided with respect to the flowchart in FIG. 10. The video system 12 starts up when the ignition switch 42 is turned on. Further, if the ignition switch 42 is not on, the video system 12 is disabled or turned off. The ignition switch 42 can be a keyless switch or a switch that requires a key, depending upon the specific vehicle design. Once the ignition switch 42 is turned on, operation moves to step S1 where the image processor 50 waits for instructions or view requests inputted by an occupant or driver of the vehicle 10.

At step S1, a determination is made by the image processor 50 whether or not the driver or an occupant of the vehicle 10 has inputted to the video control panel 46 (a controller) a request for the video images from a specific camera to be streamed to the display 44. If such a request has been inputted, the image processor 50 streams the selected captured video images to the left side of the display 44.

Included in the processing at step S1 is also detection based on signals from the vehicle sensors 48, and a determination whether or not the transmission of the vehicle is set in reverse gear indicating that the driver is backing up the vehicle 10. If the transmission is in reverse, the image processor 50 interprets that information as a request for an unaltered streaming of the area rearward of the vehicle 10 captured by the rear camera 54 (or captured by the cargo area camera 60 if the rear camera 54 is disabled). As a result, the image processor 50 streams to the left side of the display 44 unaltered video images captured by the rear camera 54 (or captured by the cargo area camera 60).

At step S2, the video images from the selected one of the plurality of cameras streamed by image processor 50 to the left side of the display 44. In the depicted examples shown in FIGS. 11-14, the selected one of the plurality of cameras is the cargo area camera 60. Thus, in each of the examples in FIGS. 11-14, the image processor 50 streams the video images from the cargo area camera 60 to left side of the display 44.

Figure 11:
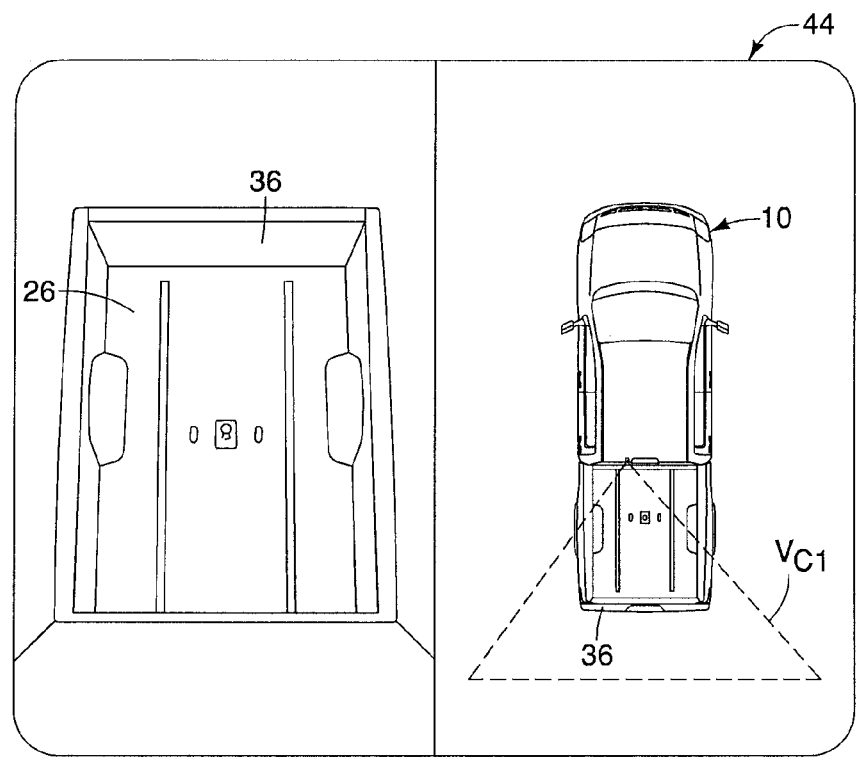
FIG. 11 is schematic view of the video display with a split screen, one side (the left side) showing the video captured by the cargo area camera and the other side (the right side) streaming a simulated overhead view streaming at least a portion of the cargo area and areas adjacent to the rear of the vehicle superimposed over a still image of the vehicle in accordance with the first embodiment.
Figure 12:
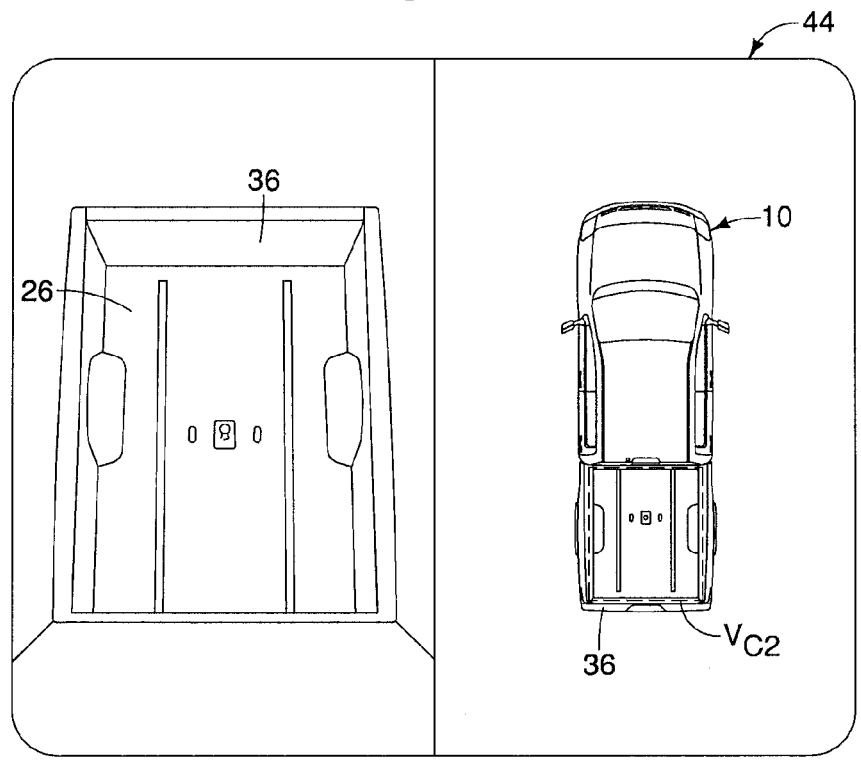
FIG. 12 is another schematic view of the video display with the split screen, one side streaming the video captured by the cargo area camera and the other side streaming a simulated overhead view of the cargo area that is squared off and superimposed over the still image of the vehicle in accordance with the first embodiment.

From step S2, operations return back to the top of the flowchart in FIG. 10, and consequently step S1 is repeated. If no further requests are made (if there is no change in the requested camera), operation moves to step S3. At step S3, the image processor 50 determines whether or not the video control panel 46 has received a request for a simulated overhead view of only the cargo area, and which type of simulated overhead view has been requested. If the image processor 50 determines that such a request has been made at step S3, then operation moves to step S4 where the image processor 50 streams one of the overhead simulated views of the cargo area 26 to the right side of the display 44. Specifically, the image processor 50 can stream the simulated overhead view $V_{C1}$ to the right side of the display 44, as indicated in FIG. 11. As shown in FIG. 11, the simulated overhead view $C_{C1}$ includes a wide angle view of the cargo area 26 and areas rearward from the rear end 20 of the vehicle 10. Alternatively, if requested by the driver or occupant, the image processor 50 can stream the simulated overhead view $V_{C2}$ to the right side of the display 44, as indicated in FIG. 12. As shown in FIG. 12, the simulated overhead view $V_{C2}$ includes only a simulated overhead view of the cargo area 26.

At step S3, if a request for not only the cargo area has been made, operation moves to step S5. At step S5, a determination is made as to whether or not a composite simulated overhead view has been requested. If a composite view has been requested, then operation then moves to step S6. At step S6, the image processor 50 determines whether or not the rear camera 54 is operable or not, for example, by receiving a signal from the tailgate sensor of the vehicle sensors 48. For example, if the tailgate 36 is in the closed position (FIG. 13), then the rear camera 54 is operable. If the tailgate 36 is down or in the open position (FIG. 14), then the rear camera 54 is not operable. Further, if the tailgate 36 has been removed from the vehicle 10, then the rear camera 54 is not operable.

Once a determination has been made at step S6, if the rear camera 54 is operable, operation moves to step S7. If the rear camera 54 is not operable, operation moves to step S9, described below.

At step S7, since the rear camera 54 is operable, the video images captured by the rear camera 54 are processed by the image processor 50, along with the images captured by the front camera 52, the passenger's side camera 56, the driver's side camera 58 and the cargo area camera 60 and operation moves to step S8. At step S8, the image processor 50 generates the simulated overhead views $V_F$, $V_R$, $V_D$, $V_P$ and $V_{C2}$, and overlays them on a still image of the vehicle 10, as shown at the right side of the display 44 in FIG. 13.

If at step S6, the image processor determines that the rear camera 54 is not operable, operation moves to step S9. At step S9, the video images captured by the front camera 52, the passenger's side camera 56, the driver's side camera 58 and the cargo area camera 60 are processed and the image processor 50 generates the simulated overhead views $V_F$, $V_D$, $V_P$ and $V_{C3}$, and overlays them on a still image of the vehicle 10, as shown at the right side of the display 44 in FIG. 14. As shown in FIG. 14, the simulated overhead view $V_{C3}$ provides a simulated overhead view $V_{C3}$ of the cargo area 26 and simulated overhead view of perceivable areas rearward of the rear end 20 of the vehicle 10.

Figure 16:
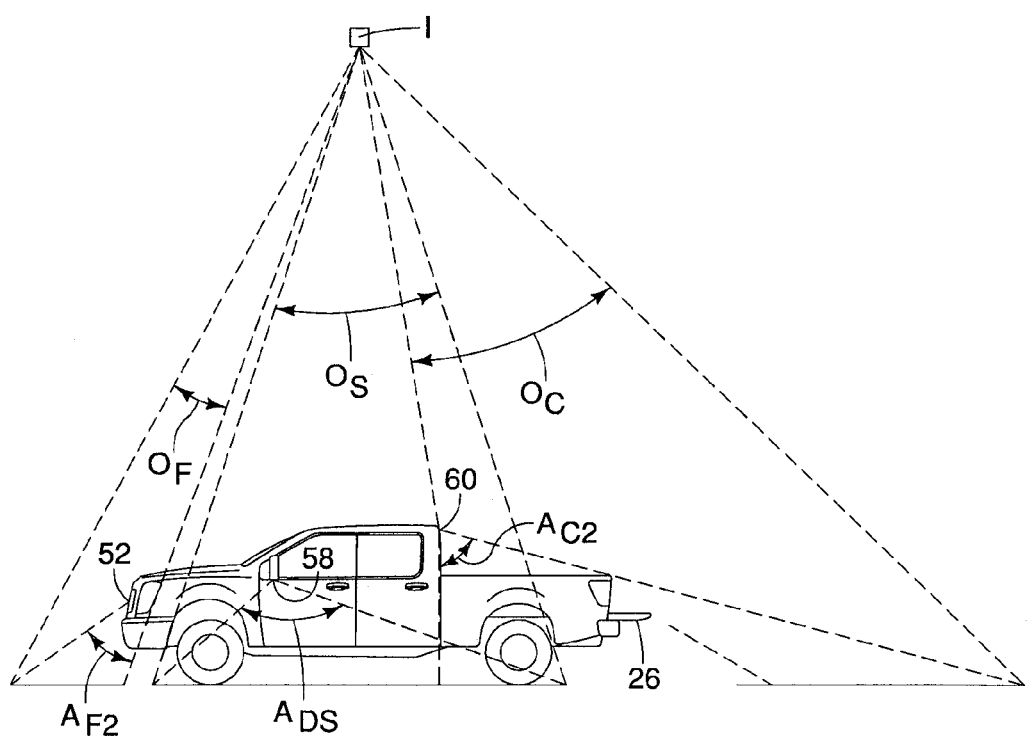
FIG. 16 is another schematic view of the vehicle showing the imaginary point above the vehicle determined by the image processor for producing the simulated overhead views of the areas around the vehicle as indicated in FIG. 14, using video captured by the cargo area camera, the front camera, the passenger's side camera and the driver's side camera, with the rear camera being disabled and the cargo area camera capturing video images of the cargo area and an area rearward of the vehicle, in accordance with the first embodiment.

The simulated overhead view $V_{C3}$ is generated in a manner consistent with the depiction in FIG. 16 of the overhead angle $O_C$ which corresponds to the area viewed by the cargo area camera 60 with the tail gate open. In FIGS. 14 and 16, the tailgate 36 is in the lowered or open position, thereby rendering the rear camera 54 inoperable.

Figure 15:
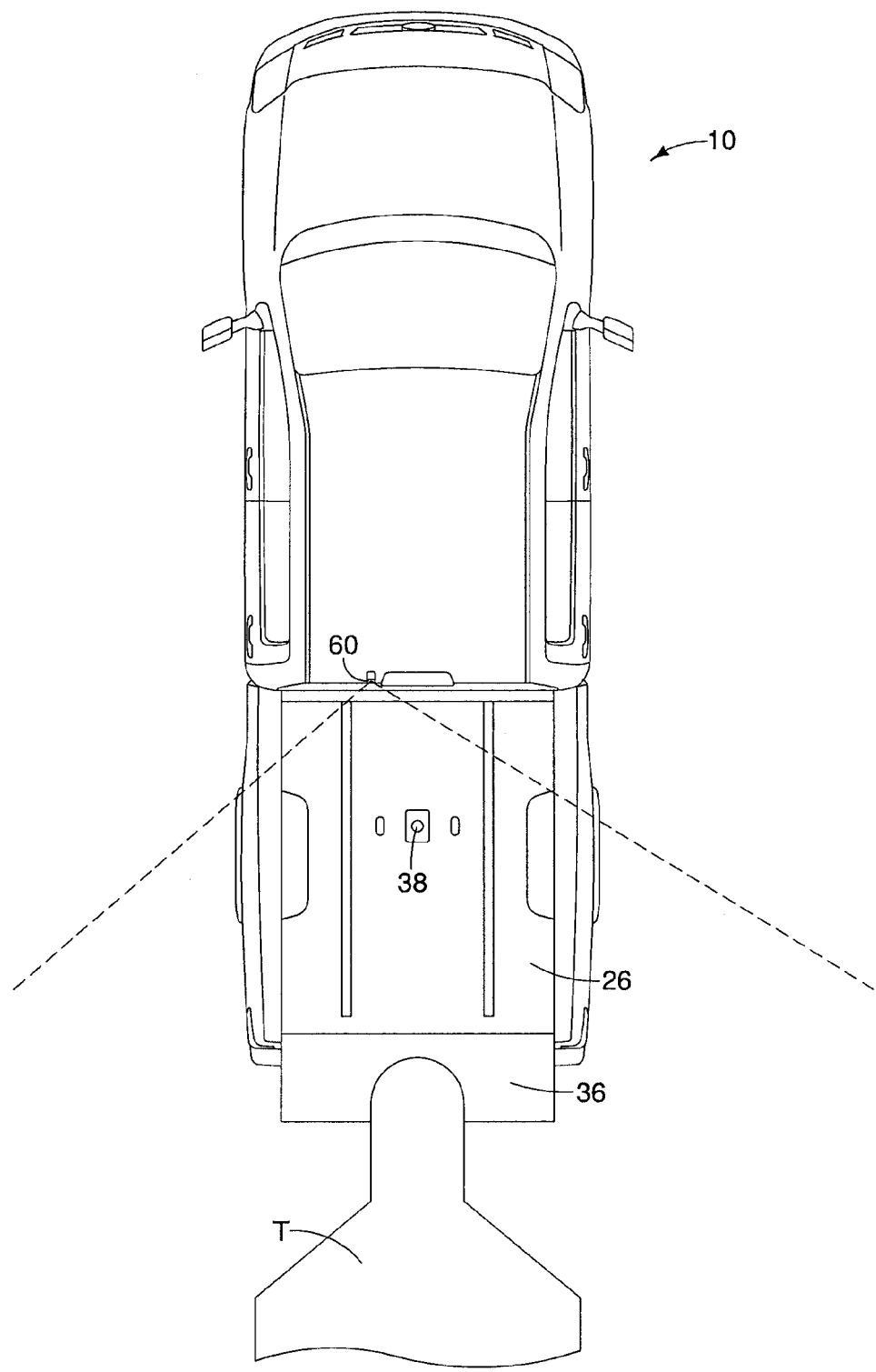
FIG. 15 is a top view of the vehicle showing an indication of a field of view of the rear camera with the tailgate down, with a trailer rearward of the vehicle and with the vehicle aligning with the trailer in order to connect to the trailer in accordance with the first embodiment.

The cargo area camera 60 provides many advantages. For example, since the rear camera 54 is installed to the tailgate 36, the cargo area camera 60 can provide s substitute rear view of the vehicle 10 when the tailgate 36 is in the open position or removed completely from the vehicle 10. Further, the cargo area camera 60 is disposed on the vehicle body 16 at a location that facilitates convenient capturing of a view of the trailer hitch receiver 38 installed to the cargo area 26 such that the driver (the vehicle operator) viewing the display 44 observes the trailer hitch receiver 38 as the vehicle moves toward a trailer hitch of a trailer T, as depicted in FIG. 15. The driver can view both the overhead simulated view $V_{C3}$ and an unaltered view of the video images captured by the cargo area camera 60 while coupling the vehicle 10 to the trailer T.

Second Embodiment

Figure 17:
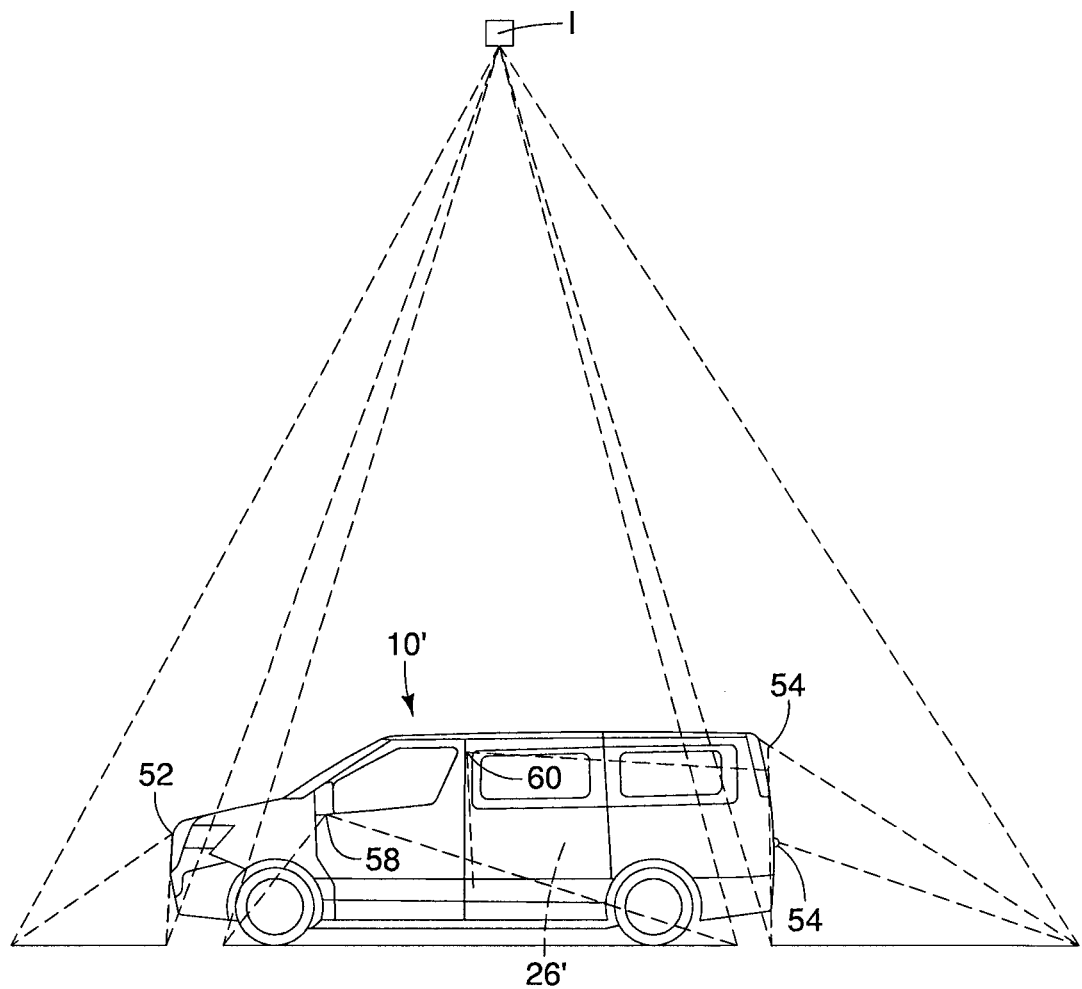
FIG. 17 is a schematic view of a vehicle showing an imaginary point above the vehicle pre-programmed into the image processor for producing simulated overhead views of an internal cargo area of the vehicle and areas around the vehicle as indicated in FIG. 18, using video captured by a cargo area camera, a front camera, a rear camera, a passenger's side camera and a driver's side camera, in accordance with a second embodiment.
Figure 18:
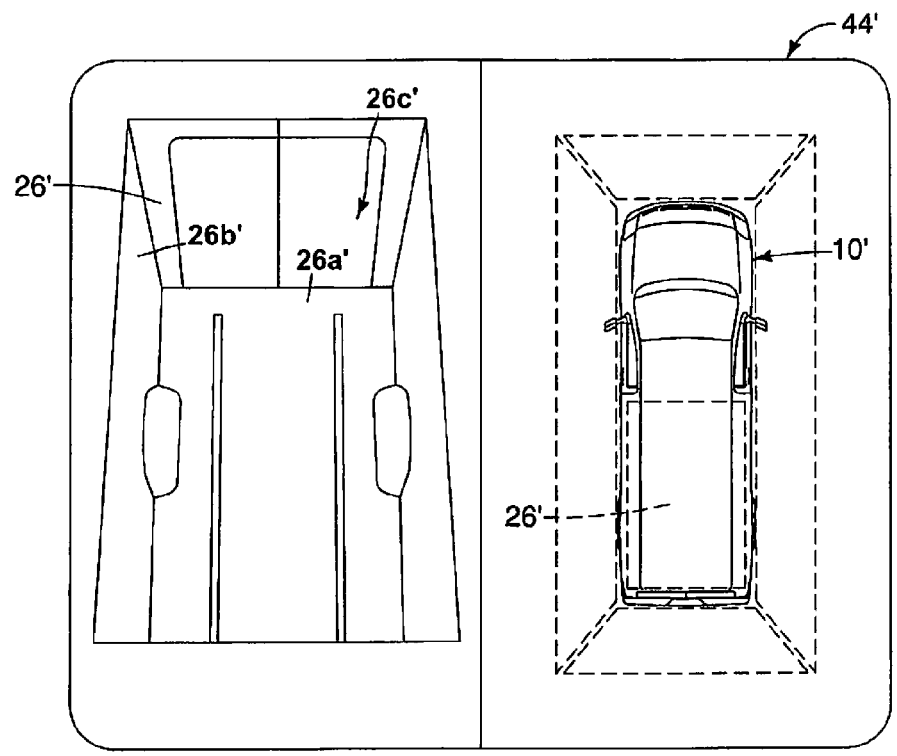
FIG. 18 is a schematic view of a video display with the split screen, one side showing the video captured by the cargo area camera and the other side showing a simulated overhead of view the cargo area and simulated overhead views of each of the areas around the vehicle captured by the front, rear, passenger's side and driver's side cameras, all superimposed over a still image of the vehicle in accordance with the second embodiment.

Referring now to FIGS. 17 and 18, a vehicle 10' depicted in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the vehicle 10' is a van that has a van structure. The vehicle 10' includes a cargo area 26' that defines an enclosed space 26c' within the van structure of the vehicle 10'. As shown in FIG. 18, the cargo area 26' includes a floor 26a', side walls 26b and a roof (removed in FIG. 18) that define the enclosed space 26c' that is configured to receive cargo (not shown). The enclosed space 26c' of the cargo area 26' is defined between side walls 26a' and above the floor 26b' of the cargo area 26'. The cargo area 26' includes a cargo area camera 60 that is basically identical to the cargo area camera 60 of the first embodiment, but is positioned to view the enclosed space 26c' of the cargo area 26'. The vehicle 10' includes a video system that is virtually identical to the video system 12 of the first embodiment as shown in FIG. 2, including the front camera 52, the rear camera 54, the passenger's side camera 56 (not shown in FIGS. 17 and 18), the driver's side camera 58 and the cargo area camera 60. In the second embodiment, the rear camera 54 is located on one of two cargo area doors of the van structure of the vehicle 10'. Further, as shown in FIG. 18, the display 44' in the second embodiment shows the interior of the cargo area 26' on the left side of the display 44' and shows the various simulated overhead views superimposed over a still image of the van structure of the vehicle 10'.

The video system in the second embodiment operates in a manner identical to the video system 12 described with respect to FIGS. 2 and 10. For example, the vehicle sensors 48 depicted in FIG. 2 can include a sensor that senses whether or not the rear cargo doors of the vehicle 10' are closed. If the rear cargo doors are not closed (doors are open), the performance of the rear camera 54 may be compromised. As described above, the cargo area camera 60 can be used to capture video images of areas rearward of the vehicle 10' as well as capture images of the cargo area 26' when the rear cargo doors are open. This feature is the same as that described above with respect to FIGS. 2 and 10.

Since all aspects of the video system described above with respect to the first embodiment are identical and operate in the same manner as in the first embodiment, further description is omitted for the sake of brevity.

Third Embodiment

Figure 19:
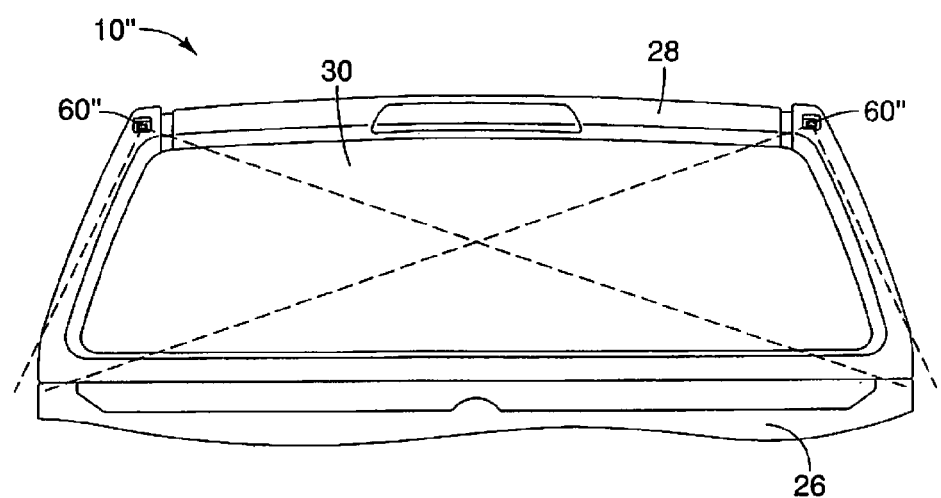
FIG. 19 is a rear view of a cabin structure portion of a vehicle showing two cargo area cameras in accordance with a third embodiment.
Figure 20:
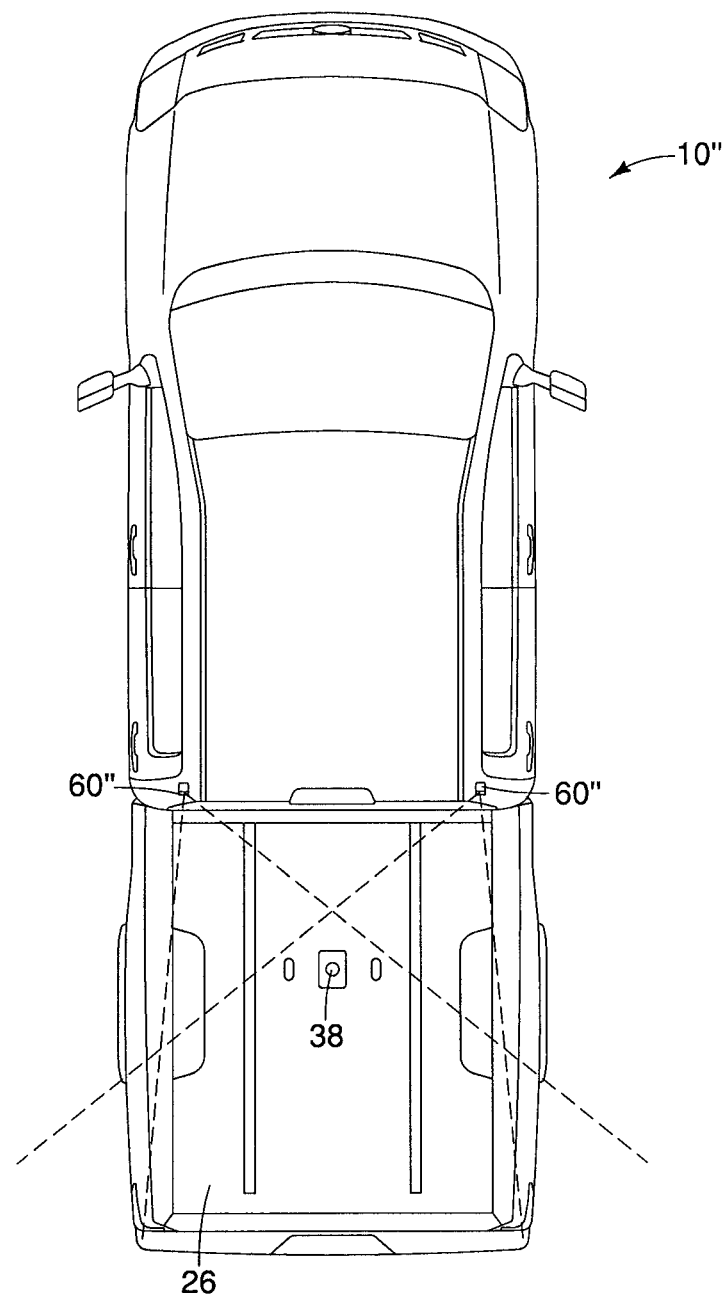
FIG. 20 is an overhead view of the vehicle showing the approximate areas captured by the two cargo area cameras in accordance with the third embodiment.

Referring now to FIGS. 19 and 20, a vehicle 10" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the video system 12 is identical to that of the first embodiment, except that the cargo area camera 60 is removed and replaced with two cargo area cameras 60". The cargo area cameras 60" are installed to the vehicle 10" at opposite rear end corners of the cabin structure and are both aimed at the cargo area 26 in order to capture video images of the cargo area. In the third embodiment, the image processor 50 is further configured to process the video images from the cargo area cameras 60" such that the simulated video overhead view of the cargo area is a composite image based upon the video images captured by the cargo area cameras 60". Further, in the event that one of the cargo area cameras 60" is blocked by cargo or another object, the image processor 50 can still generate the simulated video overhead view of the cargo area based primarily or solely on video images from a remaining unblocked one of the cargo area cameras 60".

The vehicles 10, 10' and 10" include various conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle video system. Accordingly, these terms, as utilized to describe the present invention should be interpreted relative to a vehicle equipped with the vehicle video system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle comprising:
a vehicle body defining a cargo area defining an interior space configured to receive cargo;
a display mounted to the vehicle;
a first video camera fixedly mounted to the vehicle at a first fixed location in a prescribed orientation relative to the vehicle to capture a video image of the interior space of the cargo area and is also aimed to capture images of an area rear of the vehicle;
a plurality of additional video cameras fixedly mounted to mutually differing prescribed locations around an outer periphery of the vehicle in prescribed orientations providing respective video images of areas around the outer periphery of the vehicle; and
an image processor operatively coupled to the first video camera, the plurality of video cameras and the display, the image processor being configured to display a still image of the vehicle on the display and to process the video image captured by the first video camera generating a simulated video overhead view of the interior space of the cargo area and superimpose the simulated video overhead view of the interior space of the cargo area over a portion of the still image of the vehicle corresponding to the cargo area on the display, and
the image processor being further configured to process the video images captured by each of the plurality of additional video cameras, generate further simulated overhead views of the prescribed locations around the outer periphery of the vehicle, and superimpose the further simulated overhead views to corresponding areas around the still image of the vehicle on the display, wherein the simulated live overhead view includes images of the cargo area superimposed over the still image of the vehicle on the display in an area of the still image of the vehicle corresponding to the cargo area and further displaying from the first video camera images of the area rear of the vehicle on a corresponding rear area of the still image of the vehicle on the display.

2. The vehicle according to claim 1, further comprising a controller operatively coupled to the first video camera, the display and the image processor to switch between displaying the video image of the cargo area on the display without of the still image of the vehicle and displaying the simulated video overhead view of the cargo area over the still image of the vehicle on the display.

3. The vehicle according to claim 2, wherein the first video camera is mounted relative to the vehicle at the first fixed location and is aimed at the cargo area and an area rear of the vehicle such that the displaying the video image of the cargo area includes the area rear of the vehicle, and the simulated live overhead view of the cargo area includes processed images of the area rear of the vehicle.

4. The vehicle according to claim 1, further comprising a second video camera fixedly mounted to the vehicle at a second prescribed location spaced from the first prescribed location to capture an additional video image of the cargo area, and
the image processor is configured to process the video image from the first video camera and the additional video image of the second video camera such that the simulated video overhead view of the cargo area is a composite image based upon the video image of the cargo area and the additional image.

5. The vehicle according to claim 1, wherein
the first video camera is disposed on the vehicle body to further capture a view of a trailer hitch receiver installed to the cargo area such that a vehicle operator viewing the display observes the trailer hitch receiver as the vehicle moves toward a trailer hitch of a trailer.

6. The vehicle according to claim 1, further comprising
a movable member mounted to a rear portion of the vehicle for movement between a first position and a second position such that in the first position, the movable member blocks the first video camera from capturing a video image of the an area rear of the vehicle, and in the second position the movable member does not block the first video camera from capturing a video image of the an area rear of the vehicle; and
one of the plurality of video cameras is a rear video camera fixedly mounted to the movable member such that, with the movable member in the first position, the rear video camera is positioned at a second fixed location in a prescribed orientation relative to the vehicle to capture a video image of the area rear of the vehicle, and with the movable member in the second position, the rear video camera is obscured.

7. A vehicle comprising:
a vehicle body defining a cargo area defining an interior space configured to receive cargo;
a display mounted to the vehicle;
a first video camera fixedly mounted to the vehicle at a first fixed location in a prescribed orientation relative to the vehicle to capture a video image of the interior space of the cargo area;
a plurality of additional video cameras fixedly mounted to mutually differing prescribed locations around an outer periphery of the vehicle in prescribed orientations providing respective video images of areas around the outer periphery of the vehicle, the plurality of additional video cameras including a front video camera fixed to a front portion of the vehicle, a rear video camera fixed to a rear portion of the vehicle and a pair of side video cameras fixed to opposite sides of the vehicle; and
an image processor operatively coupled to the first video camera, the plurality of video cameras and the display, the image processor being configured to display a still image of the vehicle on the display and to process the video image captured by the first video camera generating a simulated video overhead view of the interior space of the cargo area and superimpose the simulated video overhead view of the interior space of the cargo area over a portion of the still image of the vehicle corresponding to the cargo area on the display, and
the image processor is connected to each of the plurality of additional video cameras and is further configured to process the video images captured by each of the plurality of additional video cameras and generate further simulated overhead views of the prescribed locations around the outer periphery of the vehicle, and superimpose the further simulated overhead views to corresponding areas around the still image of the vehicle on the display such that the simulated video overhead view shows at least the portion of the cargo area, an area in front of the vehicle, an area behind the vehicle and areas along each side of the vehicle superimposed over a still image of the vehicle.

8. The vehicle according to claim 7, further comprising
a movable member mounted to the rear portion of the vehicle for movement between a first position and a second position such that in the first position, the movable member blocks the first video camera from capturing a video image of the an area rear of the vehicle, and in the second position the movable member does not block the first video camera from capturing a video image of the an area rear of the vehicle; and
the rear video camera is fixedly mounted to the movable member such that, with the movable member in the first position, the rear video camera is positioned at a second fixed location in a prescribed orientation relative to the vehicle to capture a video image of the area rear of the vehicle, and with the movable member in the second position, the rear video camera is obscured.

9. The vehicle according to claim 1, wherein
the cargo area is an open cargo bed; and
the first video camera is mounted to a rear section of a roof of the vehicle, the first video camera being aimed rearward at the cargo bed.

10. The vehicle according to claim 9, further comprising
a second video camera fixedly mounted to the roof of the vehicle spaced apart from the first video camera and aimed at the cargo bed to capture a video image of the cargo area.

11. The vehicle according to claim 10, wherein
the image processor is configured to process the video image from the first video camera and the video image of the second video camera such that the simulated video overhead view is a composite image based upon the video images captured the first and second video cameras.

12. A vehicle comprising:
a vehicle body defining a cargo area inside an enclosed space within the vehicle body configured to receive cargo;
a display mounted to the vehicle;
a first video camera fixedly mounted to the vehicle at a first fixed location in a prescribed orientation within the enclosed space to capture a video image of the enclosed space of the cargo area;
a plurality of additional video cameras fixedly mounted to mutually differing prescribed locations around an outer periphery of the vehicle in prescribed orientations providing respective video images of areas around the outer periphery of the vehicle; and
an image processor operatively coupled to the first video camera, the plurality of video cameras and the display, the image processor being configured to display a still image of the vehicle on the display and to process the video image captured by the first video camera generating a simulated video overhead view of the enclosed space of the cargo area and superimpose the simulated video overhead view of the enclosed space of the cargo area over a portion of the still image of the vehicle corresponding to the cargo area on the display, and
the image processor being further configured to process the video images captured by each of the plurality of additional video cameras, generate further simulated overhead views of the prescribed locations around the outer periphery of the vehicle, and superimpose the further simulated overhead views to corresponding areas around the still image of the vehicle on the display.

13. The vehicle according to claim 12, further comprising
a second video camera fixedly mounted within the cargo area of the vehicle spaced apart from the first video camera aimed at the cargo area to capture a video image of the cargo area.

14. The vehicle according to claim 13, wherein
the image processor is configured to process the video image from the first video camera and the video image of the second video camera such that the simulated video overhead view is a composite image based upon the video images captured the first and second video cameras.

15. The vehicle according to claim 12, wherein
the plurality of additional video cameras includes a front video camera, a rear video camera and a pair of side video cameras, and
the image processor is connected to each of the plurality of additional video cameras such that the simulated video overhead view shows at least the portion of the cargo area, an area in front of the vehicle, an area behind the vehicle and areas along each side of the vehicle superimposed over a still image of the vehicle.

16. A vehicle comprising:
a vehicle body defining a cargo area defining an interior space configured to receive cargo;
a display mounted to the vehicle;
a first video camera fixedly mounted to the vehicle at a first fixed location in a prescribed orientation relative to the vehicle to capture a video image of the interior space of the cargo area and an area rearward of the vehicle body;
a plurality of additional video cameras including:
  a front video camera fixedly mounted proximate a front end of the vehicle at a fixed location in a prescribed orientation relative to the vehicle to capture a video image of an area forward of the vehicle body;
  a first side video camera fixedly mounted proximate a first side of the vehicle at a fixed location in a prescribed orientation relative to the vehicle to capture a video image of an area adjacent to the first side of the vehicle body; and
  a second side video camera fixedly mounted proximate a second side of the vehicle opposite the first side at a fixed location in a prescribed orientation relative to the vehicle to capture a video image of an area adjacent to the first side of the vehicle body;
and
an image processor operatively coupled to the first video camera, the plurality of video cameras and the display, the image processor being configured to display a still image of the vehicle on the display and to process the video image captured by the first video camera generating a simulated video overhead view of the interior space of the cargo area and a simulated video overhead view the area rearward of the vehicle body, and superimpose the simulated video overhead view of the interior space of the cargo area over a portion of the still image of the vehicle corresponding to the cargo area on the display, and superimpose the simulated video overhead view of the area rearward of the vehicle body over a portion of the still image of the vehicle corresponding to the area rearward of the vehicle body, and
the image processor being further configured to process the video images captured by each of the plurality of additional video cameras, generate further simulated overhead views the area forward of the vehicle body, the area adjacent to the first side of the vehicle body and the area adjacent to the second side of the vehicle body and superimpose the further simulated overhead views to corresponding areas around the still image of the vehicle on the display.

* * * * *